United States Patent
Kinney et al.

(10) Patent No.: US 6,501,995 B1
(45) Date of Patent: Dec. 31, 2002

(54) PROCESS CONTROL SYSTEM AND METHOD WITH IMPROVED DISTRIBUTION, INSTALLATION AND VALIDATION OF COMPONENTS

(75) Inventors: Thomas B. Kinney, Franklin, MA (US); T. Eric Christiansen, Fall River, MA (US); Peter D. Hansen, Wellesley, MA (US); Bo Ling, Sharon, MA (US); Paul C. Badavas, Southboro, MA (US); Richard L. Thibault, Plainville, MA (US)

(73) Assignee: The Foxboro Company, Foxboro, MA (US)

( * ) Notice: Subject to any disclaimer, the term of this patent is extended or adjusted under 35 U.S.C. 154(b) by 0 days.

(21) Appl. No.: 09/345,215

(22) Filed: Jun. 30, 1999

(51) Int. Cl.$^7$ .............................................. G05B 15/00
(52) U.S. Cl. .......................................... 700/1; 717/168
(58) Field of Search .............................. 700/81, 82, 79, 700/2, 9, 1; 714/11, 4; 717/168

(56) References Cited

U.S. PATENT DOCUMENTS

| | | | |
|---|---|---|---|
| 3,810,119 A | | 5/1974 | Zieve et al. |
| 3,825,905 A | | 7/1974 | Allen, Jr. |
| 4,096,566 A | | 6/1978 | Borie et al. |
| 4,276,593 A | * | 6/1981 | Hansen .................. 700/79 |
| 4,302,820 A | | 11/1981 | Struger et al. |
| 4,312,068 A | | 1/1982 | Goss et al. |
| 4,323,966 A | | 4/1982 | Whiteside et al. |
| 4,347,563 A | | 8/1982 | Paredes et al. |
| 4,351,023 A | * | 9/1982 | Richer .................. 700/82 |
| 4,410,942 A | | 10/1983 | Milligan et al. |
| 4,423,486 A | | 12/1983 | Berner |
| 4,428,044 A | | 1/1984 | Liron |
| 4,435,762 A | | 3/1984 | Milligan et al. |
| 4,456,997 A | | 6/1984 | Spitza |
| 4,466,098 A | | 8/1984 | Southard |

(List continued on next page.)

FOREIGN PATENT DOCUMENTS

| | | |
|---|---|---|
| EP | 0 411 869 A3 | 7/1990 |
| WO | WO 96/31047 | 3/1996 |
| WO | WO 96/23377 | 8/1996 |
| WO | WO 97/07486 | 2/1997 |
| WO | WO 98/20649 | 5/1998 |
| WO | WO 98/36518 | 8/1998 |
| WO | WO 98/54843 | 12/1998 |

OTHER PUBLICATIONS

Chapter 7, "Ping Program," pp. 85–96.
*ICCard Design* Sep./Oct. 1995.
Strack, Bob. "The HAWK is Soaring," *Chemical Processing* (May 1996) p. 11.

(List continued on next page.)

*Primary Examiner*—Thomas Black
*Assistant Examiner*—Edward F. Gain, Jr.
(74) *Attorney, Agent, or Firm*—David J. Powsner; Nutter McClennen & Fish LLP

(57) ABSTRACT

A control system has blocks or other components that facilitate validation of their own replacements, e.g., downloaded via e-commerce transactions. The system includes first and second process control components. The first component is coupled to a third process control component, with which it transfers information, e.g., as part of an active or ongoing control process. The second component can be, for example, an update or other potential replacement for the first component. The first and/or second components can effect substitution of the second component for the first. More particularly, they can effect coupling of the second component for information transfer with the third component and decoupling of the first component from such transfer with the third component. Preferably, such coupling and decoupling occur while the process control system remains active.

9 Claims, 3 Drawing Sheets

U.S. PATENT DOCUMENTS

| | | | |
|---|---|---|---|
| 4,471,457 A | 9/1984 | Videki, II | |
| 4,488,226 A | 12/1984 | Wagner, Jr. et al. | |
| 4,493,027 A | 1/1985 | Katz et al. | |
| 4,609,995 A | 9/1986 | Hasebe | |
| 4,615,001 A | 9/1986 | Hudgins, Jr. | |
| 4,628,437 A | 12/1986 | Poschmann et al. | |
| 4,641,276 A | 2/1987 | Dunki-Jacobs | |
| 4,648,064 A | 3/1987 | Morley | |
| 4,649,479 A | 3/1987 | Advani et al. | |
| 4,663,704 A | 5/1987 | Jones et al. | |
| 4,672,530 A | 6/1987 | Schuss | |
| 4,675,812 A | 6/1987 | Capowski et al. | |
| 4,682,304 A | 7/1987 | Tierney | |
| 4,683,530 A | 7/1987 | Quatse | |
| 4,692,859 A | 9/1987 | Ott | |
| 4,692,918 A | 9/1987 | Elliott et al. | |
| 4,703,421 A | 10/1987 | Abrant et al. | |
| 4,709,325 A | 11/1987 | Yajima | |
| 4,719,593 A | 1/1988 | Threewitt et al. | |
| 4,727,477 A | 2/1988 | Gavril | |
| 4,733,366 A | 3/1988 | Deyesso et al. | |
| 4,742,349 A | 5/1988 | Miesterfeld et al. | |
| 4,750,109 A | 6/1988 | Kita | |
| 4,790,762 A | 12/1988 | Harms et al. | |
| 4,805,107 A | 2/1989 | Kieckhafer et al. | |
| 4,816,996 A | 3/1989 | Hill et al. | |
| 4,817,094 A | 3/1989 | Lebizay et al. | |
| 4,872,106 A | 10/1989 | Slater | |
| 4,897,777 A | 1/1990 | Janke et al. | |
| 4,910,658 A | 3/1990 | Dudash et al. | |
| 4,910,691 A | 3/1990 | Skeirik | |
| 4,918,690 A | 4/1990 | Markkula, Jr. et al. | |
| 4,958,277 A | 9/1990 | Hill et al. | |
| 4,959,774 A | 9/1990 | Davis | |
| 4,965,717 A | 10/1990 | Cutts, Jr. et al. | |
| 4,965,742 A | 10/1990 | Skeirik | |
| 4,965,880 A | 10/1990 | Petitjean | |
| 4,991,170 A | 2/1991 | Kem | |
| 5,008,805 A | 4/1991 | Fiebig et al. | |
| 5,050,165 A | 9/1991 | Yoshioka et al. | |
| 5,068,778 A | 11/1991 | Kosem et al. | |
| 5,122,948 A | 6/1992 | Zapolin | |
| 5,129,087 A | 7/1992 | Will | |
| 5,131,092 A | 7/1992 | Sackmann et al. | |
| 5,134,574 A | 7/1992 | Beaverstock et al. | |
| 5,136,704 A | 8/1992 | Danielsen et al. | |
| 5,138,708 A | 8/1992 | Vosbury | |
| 5,146,589 A | 9/1992 | Peet, Jr. et al. | |
| 5,151,978 A | 9/1992 | Bronikowski et al. | |
| 5,151,981 A | 9/1992 | Westcott et al. | |
| 5,159,673 A | 10/1992 | Sackmann et al. | |
| 5,162,986 A | 11/1992 | Graber et al. | |
| 5,163,055 A | 11/1992 | Lee et al. | |
| 5,166,685 A | 11/1992 | Campbell, Jr. et al. | |
| 5,168,276 A | 12/1992 | Huston et al. | |
| 5,175,829 A | 12/1992 | Stumpf et al. | |
| 5,193,175 A | 3/1993 | Cutts, Jr. et al. | |
| 5,212,784 A | 5/1993 | Sparks | |
| 5,233,615 A | 8/1993 | Goetz | |
| 5,245,704 A | 9/1993 | Weber et al. | |
| 5,255,367 A | 10/1993 | Bruckert et al. | |
| 5,258,999 A | 11/1993 | Wernimont et al. | |
| 5,271,013 A | 12/1993 | Gleeson | |
| 5,283,729 A | 2/1994 | Lloyd | |
| 5,289,365 A | 2/1994 | Caldwell et al. | |
| 5,295,258 A | 3/1994 | Jewett et al. | |
| 5,295,263 A | * 3/1994 | Kojima et al. ............... | 713/100 |
| 5,297,143 A | 3/1994 | Fridrich et al. | |
| 5,302,952 A | 4/1994 | Campbell, Jr. et al. | |
| 5,303,227 A | 4/1994 | Herold et al. | |
| 5,303,375 A | 4/1994 | Collins et al. | |
| 5,303,392 A | 4/1994 | Carney et al. | |
| 5,307,372 A | 4/1994 | Sawyer et al. | |
| 5,307,463 A | 4/1994 | Hyatt et al. | |
| 5,317,726 A | 5/1994 | Horst | |
| 5,335,221 A | 8/1994 | Snowbarger et al. | |
| 5,347,181 A | 9/1994 | Ashby et al. | |
| 5,349,343 A | 9/1994 | Oliver | |
| 5,352,033 A | 10/1994 | Gresham et al. | |
| 5,359,721 A | 10/1994 | Kempf et al. | |
| 5,381,529 A | 1/1995 | Matsushima | |
| 5,390,321 A | 2/1995 | Proesel | |
| 5,398,331 A | 3/1995 | Huang et al. | |
| 5,400,140 A | 3/1995 | Johnston | |
| 5,410,703 A | * 4/1995 | Nilsson et al. ............... | 713/330 |
| 5,410,717 A | 4/1995 | Floro | |
| 5,418,524 A | * 5/1995 | Fennell ...................... | 340/7.41 |
| 5,421,017 A | * 5/1995 | Scholz et al. ................ | 717/170 |
| 5,428,781 A | 6/1995 | Duault et al. | |
| 5,434,997 A | 7/1995 | Laundry et al. | |
| 5,444,851 A | 8/1995 | Woest | |
| 5,444,861 A | * 8/1995 | Adamec et al. ............. | 717/178 |
| 5,450,403 A | 9/1995 | Ichii et al. | |
| 5,450,425 A | 9/1995 | Gunn et al. | |
| 5,450,764 A | 9/1995 | Johnston | |
| 5,451,939 A | 9/1995 | Price | |
| 5,457,797 A | 10/1995 | Butterworth et al. | |
| 5,459,839 A | 10/1995 | Swarts et al. | |
| 5,463,735 A | 10/1995 | Pascucci et al. | |
| 5,475,856 A | 12/1995 | Kogge | |
| 5,481,741 A | 1/1996 | McKaskle et al. | |
| 5,483,660 A | 1/1996 | Yishay et al. | |
| 5,485,620 A | 1/1996 | Sadre et al. | |
| 5,490,276 A | 2/1996 | Doli, Jr. et al. | |
| 5,504,902 A | 4/1996 | McGrath et al. | |
| 5,509,811 A | 4/1996 | Homic | |
| 5,513,095 A | 4/1996 | Pajonk | |
| 5,513,192 A | 4/1996 | Janku et al. | |
| 5,513,354 A | 4/1996 | Dwork et al. | |
| 5,517,655 A | 5/1996 | Collins et al. | |
| 5,519,701 A | 5/1996 | Colmant et al. | |
| 5,522,044 A | 5/1996 | Pascucci et al. | |
| 5,530,643 A | 6/1996 | Hodorowski | |
| 5,539,909 A | 7/1996 | Tanaka et al. | |
| 5,544,008 A | 8/1996 | Dimmick et al. | |
| 5,550,980 A | 8/1996 | Pascucci et al. | |
| 5,551,047 A | 8/1996 | Mori et al. | |
| 5,555,213 A | 9/1996 | DeLong | |
| 5,555,418 A | * 9/1996 | Nilsson et al. ............... | 717/153 |
| 5,555,437 A | 9/1996 | Packer | |
| 5,555,510 A | 9/1996 | Verseput et al. | |
| 5,559,963 A | 9/1996 | Gregg et al. | |
| 5,568,378 A | 10/1996 | Wojsznis | |
| 5,572,673 A | 11/1996 | Shurts | |
| 5,576,946 A | 11/1996 | Bender et al. | |
| 5,579,220 A | * 11/1996 | Barthel et al. ................ | 700/82 |
| 5,579,487 A | 11/1996 | Meyerson et al. | |
| 5,581,760 A | 12/1996 | Atkinson et al. | |
| 5,586,112 A | 12/1996 | Tabata | |
| 5,586,329 A | 12/1996 | Knudsen et al. | |
| 5,586,330 A | 12/1996 | Knudsen et al. | |
| 5,587,899 A | 12/1996 | Ho et al. | |
| 5,594,899 A | 1/1997 | Knudsen et al. | |
| 5,596,752 A | 1/1997 | Knudsen et al. | |
| 5,598,536 A | 1/1997 | Slaughter, III et al. | |
| 5,600,845 A | 2/1997 | Gilson | |
| 5,604,871 A | 2/1997 | Pecone | |
| 5,611,057 A | 3/1997 | Pecone et al. | |
| 5,613,148 A | 3/1997 | Bezviner et al. | |

| | | |
|---|---|---|
| 5,617,540 A | 4/1997 | Civanlar et al. |
| 5,627,979 A | 5/1997 | Chang et al. |
| 5,629,949 A | 5/1997 | Zook |
| 5,630,056 A | 5/1997 | Horvath et al. |
| 5,630,152 A | 5/1997 | DeLuca et al. |
| 5,642,511 A | 6/1997 | Chow et al. |
| 5,649,121 A | 7/1997 | Budman et al. |
| 5,655,092 A | 8/1997 | Ojala |
| 5,659,680 A | 8/1997 | Cunningham et al. |
| 5,664,101 A | 9/1997 | Picache |
| 5,664,168 A | 9/1997 | Yishay et al. |
| 5,671,374 A | 9/1997 | Postman et al. |
| 5,676,141 A | 10/1997 | Hollub |
| 5,680,404 A | 10/1997 | Gray |
| 5,680,409 A | 10/1997 | Qin et al. |
| 5,682,476 A | 10/1997 | Tapperson et al. |
| 5,687,316 A | 11/1997 | Graziano et al. |
| 5,701,414 A | 12/1997 | Cheng et al. |
| 5,708,779 A | 1/1998 | Graziano et al. |
| 5,727,128 A | 3/1998 | Morrison |
| 5,727,215 A * | 3/1998 | Rynaski et al. ............. 717/173 |
| 5,732,218 A | 3/1998 | Bland et al. |
| 5,737,529 A | 4/1998 | Dolin, Jr. et al. |
| 5,742,762 A | 4/1998 | Scholl et al. |
| 5,748,467 A | 5/1998 | Qin et al. |
| 5,751,574 A * | 5/1998 | Loebig ........................ 700/82 |
| 5,752,007 A | 5/1998 | Morrison |
| 5,752,008 A | 5/1998 | Bowling |
| 5,752,246 A | 5/1998 | Rogers et al. |
| 5,754,772 A | 5/1998 | Leaf |
| 5,758,073 A | 5/1998 | Liang et al. |
| 5,758,075 A | 5/1998 | Graziano et al. |
| 5,761,518 A * | 6/1998 | Beohling et al. ............. 710/1 |
| 5,764,906 A | 6/1998 | Edelstein et al. |
| 5,768,119 A | 6/1998 | Havekost et al. |
| 5,768,510 A | 6/1998 | Gish |
| 5,774,670 A | 6/1998 | Montulli |
| 5,777,874 A | 7/1998 | Flood et al. |
| 5,790,791 A | 8/1998 | Chong et al. |
| 5,793,963 A | 8/1998 | Tapperson et al. |
| 5,796,602 A | 8/1998 | Wellan et al. |
| 5,797,038 A | 8/1998 | Crawford et al. |
| 5,801,770 A | 9/1998 | Paff et al. |
| 5,801,942 A | 9/1998 | Nixon et al. |
| 5,805,442 A | 9/1998 | Crater et al. |
| 5,805,922 A | 9/1998 | Sim et al. |
| 5,819,050 A * | 10/1998 | Boehling et al. ........... 710/104 |
| 5,822,220 A | 10/1998 | Baines |
| 5,828,851 A | 10/1998 | Nixon et al. |
| 5,831,669 A | 11/1998 | Adrain |
| 5,841,360 A | 11/1998 | Binder |
| 5,841,963 A | 11/1998 | Nakamikawa et al. |
| 5,844,601 A | 12/1998 | McPheely et al. |
| 5,844,796 A * | 12/1998 | Araki ........................ 700/86 |
| 5,847,957 A | 12/1998 | Cohen et al. |
| 5,854,944 A | 12/1998 | Catherwood et al. |
| 5,862,052 A | 1/1999 | Nixon et al. |
| 5,872,992 A | 2/1999 | Tietjen et al. |
| 5,873,089 A | 2/1999 | Regache |
| 5,874,990 A | 2/1999 | Kato |
| 5,880,775 A | 3/1999 | Ross |
| 5,909,586 A | 6/1999 | Anderson |
| 5,930,768 A | 7/1999 | Hooban |
| 5,956,487 A | 9/1999 | Venkatraman et al. |
| 5,960,205 A * | 9/1999 | Mao et al. ................. 717/170 |
| 5,966,304 A * | 10/1999 | Cook et al. .................... 700/82 |
| 5,975,737 A | 11/1999 | Crater et al. |
| 5,980,090 A | 11/1999 | Royal, Jr. et al. |
| 5,982,362 A | 11/1999 | Crater et al. |
| 5,994,998 A | 11/1999 | Fisher et al. |
| 6,009,525 A * | 12/1999 | Horstmann ................. 713/200 |
| 6,055,633 A | 4/2000 | Schrier et al. |
| 6,070,250 A * | 5/2000 | Yeager et al. ................. 714/11 |
| 6,104,875 A * | 8/2000 | Gallagher et al. .......... 717/168 |
| 6,061,603 A | 9/2000 | Papadopoulos et al. |
| 6,115,468 A | 9/2000 | De Nicolo |
| 6,139,177 A | 10/2000 | Venkatraman et al. |
| 6,140,911 A | 10/2000 | Fisher et al. |
| 6,151,625 A | 11/2000 | Swales et al. |
| 6,173,414 B1 * | 1/2001 | Zumkehr et al. .............. 714/6 |
| 6,176,421 B1 | 1/2001 | Royal, Jr. et al. |
| 6,201,996 B1 | 3/2001 | Crater et al. |
| 6,205,581 B1 * | 3/2001 | Kang ........................ 717/173 |
| 6,218,930 B1 | 4/2001 | Katzenberg et al. |

OTHER PUBLICATIONS

"Control System Features Plug–and–Play Technology, Scalability," *Chemical Processing* (May 1996), p. 33.

"Editors' Product Picks," *Chemical Processing* (May 1996), p. 34.

"Tribe Computer Works' Net Products Can be Managed via World Wide Web," IAC (SM) Newsletter Database™, Data Trends Publications, Inc., No. 11, vol. 7, May 30, 1995.

"Briefs," Network World, May 29, 1995, p. 19.

Wilder, Clinton, "Network Management; Russing Nets Via The Web—Tribe's WebManage uses popular interface," informationWeek, May 29, 1995, p. 62.

"Pipeline; Announced," InfoWorld, May 29, 1995, p. 45.

Bernard, Viki, "Remote–access ware emerge; Shiva, Nortel, and Tribe leading list of innovators," PCWeek, No. 21, vol. 12, May 29, 1995, p. 47.

"Tribe Announces Revolutionary Use of the Internet; Launches Innovative Remote Management Solution; New WebManage Technology Provides Network Management via World Wide Web," Business Wire, May 22, 1995.

"Tribe Launches First Networking Device Capable of Being Managed via Internet Web Browser; TribeLink2 Enables Remote Computing and Internet Access," Business Wire, May 22, 1995.

Dryden, Patrick, "Tribes WebManage Enables Remote Fixes," ComputerWorld, May 22, 1995, p. 14.

Ko, Diffu, "Trobe defines net management role for Web browser software," Network World, May 22, 1995, p. 14.

"Tour an actual TribeLink via WebManage," web page print–out from http://www.tribe.com/products/webmanage/quick$_{13}$ view.htm. (1 page), no date.

"Tribe Launches Innovative Remote Management Solution; New WebManage Technology Provides Network Management Via the World Wide Web," web page print–out (Jul. 12, 1999) from http://www.tribe.com/products/webmanage/wm_pr. (1 page).

"TribeRoute," web page print–out (Jul. 12, 1999) from http://www.tribe.com/products/tr/index. (3 pages).

"TribeStar," web page print–out from http://www.tribe.com/products/tribestar/index.htm (3 pages), no date.

Pappalardo, Denise, "Router Can Be Managed via Net," InternetWeek, May 22, 1995, p. 6.

Rodriguez, Karen, "Tribe sets software," Interactive Age, vol. 2, No. 15, May 22, 1995, p. 25.

Welch, Nathalie, "Tribe to manage via Web; Tribe Computer Works Inc.'s TribeLink2 Product Announcement," MacWEEK, vol. 9, No. 21, May 22, 1995, p. 18.

Pappalardo, Denise, "Digi Introduces IP/IPX Router," InternetWeek, Apr. 24, 1995, p. 15.

"WWWF'94: Papers Received," web page print–out (Apr. 7, 2000) from http://www.ncsa.uiuc.edu/SDG/IT94/Agenda/Papers–received.html (8 pages).

Elmer–Dewitt, Philip, "Snowballs in Cyberspace; With a modem and a soldering iron, you too can build an Internet site that is really cool and totally useless," Time, Jan. 16, 1995, p. 57.

Scharf, Ronald, et al, "Using Mosaic for Remote Test System Control Supports Distributed Engineering," Institute of Computer–Aided Circuit Design—Test and Testsystems Division, University of Erlangen–Nurnberg, Germany, web page print–out from http://www.ncsa.uiuc.edu/SDG/IT94/Proceedings/CSCW/scharf/scharf.html (8 pages), no date.

Cox, Mark J. and Baruch, Dr. John E. F. "Robotic Telescopes: An Interactive Exhibit on the World–Wide Web," web page print–out from http://www.ncsa.uiuc.edu/SDG/IT94/Proceedings/Museum/cox/markcox.html (11 pages), no date.

Gleick, James. "Fast Forward; Really Remote Control," The New York Times, Section 6, Column 3, p. 42, Dec. 3, 1995.

Silverman, Dwight. "Attaboy' for the best software and hardware of 1994," The Houston Chronicle, Dec. 25, 1994, p. 2.

Browne, Malcolme W. "South Pole Ready for Internet Revolution," The New York Times Section C, Column 1, p. 1, Jan. 10, 1995.

Wolfe, Alexander, "Strong Brew," Electronic Engineering Times, Apr. 8, 1996, p. 73.

"Special Topic: PC–Based Control," A Supplement to Software Strategies, pp. 3–5, 7–8, 10–15, 20–21, no date.

Momal, F. and Pinto–Pereira, C. "Using World–Wide–Web for Control Systems," from Proceedings 1995 International Conference on Accelerator and Large Experimental Physics Control Systems, Chicago, IL, Oct. 30–Nov. 3, 1995.

"The 'Only' Coke Machine on the Internet," web page print–out (Feb. 12, 1999) from http://www.cs.cmu.edu/~coke/history_long.txt (3 pages).

"CMU SCS Coke Machine: Current Status," web page print–out (Feb. 12, 1999) from http://www.cs.cmu.edu/~coke/ (1 page).

"The Switzerland Coke Machine Credits," web page print–out (Feb. 12, 1999) from http://www–swiss.ai.mit.edu/htbin/coke/ (1 page).

"Peter Beebee's Home Page," web page print–out (Feb. 12, 1999) from http://www–swiss.ai.mit.edu/htbin/ptbbgate/jwz/?fetch+personal%2Fmain.text.html (2 pages).

"bsy's List of Internet Accessible Coke Machines," web page print–out (Feb. 12, 1999) from http://www–cse.ucsd.edu/users/bsy/coke.html (1 page).

"Disk Drive with Embedded Hyper–Text Markup Language Server," IBM TDB, vol. 38, No. 12, Dec. 1995, pp. 479–480.

Leon, Mark, "Tektronix to add Web software on new printers," InfoWorld, Dec. 4, 1995, p. 6.

"I/A Series Model 51 FoxRemote II Installation and Configuration Guide," Apr. 8, 1998 (Preliminary), pp. i–iv, 1–2.

"New State–Logic Microcontroller," News Release, Control Technology Corp., Jun. 1, 1996, (DialogWeb search result).

"NEW at IPC/92: Ethernet link provides Global PLC Registers," News Release, Control Technology (US), Nov. 20, 1992, (DialogWeb search result).

"NEW at IPC/92: High–Capacity integrated Motion Controller," News Release, Control Technology (US) Nov. 20, 1992, (DialogWeb search result).

"Dual–Axis Servo Module for Small Controller," News Release, Control Technology (US), Sep. 11, 1990, (DialogWeb search result).

"Innovative Small Controller Family offers Full Integration," News Release, Control Technology, Aug. 17, 1989, (DialogWeb search result).

AC I/O Modules Available for Low–Cost Automation Controller, News Release, Control Technology Corporation, Jun. 28, 1989, (DialogWeb search result).

"New Small Automation Controller features Precision Analog I/O Modules," News Release, Control Technology (US), May 30, 1989, (DialogWeb search result).

"Inexpensive Automation Controller features Message Display Capability," News Release, Control Technology (US), May 19, 1989, (DialogWeb search result).

"Small Multi–Tasking Controller for Cost–sensitive Applications," News Release, Control Technology US, Nov. 8, 1988, (DialogWeb search result).

"CAD/CAM Software creates Automation 'Programming Environment'," News Release, Control Technology (US), Oct. 3, 1988, (DialogWeb search result).

"Automation Programming Environment runs On IBM (R)–PC," News Release, Control Technology (US), Mar. 29, 1988, (DialogWeb search result).

"Low–Cost Automation Controller features Motion Control, Communications," News Release, Control Technology (US), Mar. 7, 1988, (DialogWeb search result).

"System Provides Stepping Motor Control in Workcell Environment," News Release, Control Technology Corp., Dec. 5, 1986, (DialogWeb search result).

"Multi–Tasking Controller provides High–level Instructions for Motion Control, Sequencing," News Release, Control Technology Corporation, Aug. 22, 1986, (DialogWeb search result).

"Operator's Console creates 'Friendly' Machines," News Release, Control Technology (US), May 19, 1986, (DialogWeb search result).

"Automation Controller features fast 80186 Processor, Integrated Software," News Release, Control Technology (US), Apr. 22, 1986, (DialogWeb search result).

"Plug–Compatible Controls and Actuators Speed System Development," News Release Control Technology (US), Jan. 13, 1986, (DialogWeb search result).

"Modular Valve Assemblies Connect to Controller with Ribbon Cable," New Product Release, Control Technology (US), Jan. 8, 1986, (DialogWeb search result).

"Linear Actuators offer Plug–Compatibility with Controller," News Release, Control Technology (US), Nov. 21, 1985, (DialogWeb search result).

"Compact System combines Motion Control, Machine Control," News Release, Control Technology, May 28, 1985, (DialogWeb search result).

"Automation Controller accepts Customization," News Release, Control Technology, Jul. 12, 1985, (DialogWeb search result).

"SECS–11 Communication Board Plugs into Automation Controller," News Release, Control Technology, Aug. 26, 1985, (DialogWeb search result).

"Operator's Console for Automated Machines," News Release, Control Technology, Aug. 15, 1985, (DialogWeb search result).

"Programmable Controller offers control of Stepping and Servo Motors," News Release, Control Technology, May 31, 1985, (DialogWeb search result).

Taylor, Ken and Trevelyan, James, "A Telerobot on the World Wide Web," printed from http://telerobot.mech.un-wa.edu.au/ROBOT/telerobo.htm (14 pages), no date.

"On–Line Vending Machine and Catalog Product Icons," IBM TDB, v. 38, No. 4 (Apr. 1995), pp. 113–116.

Tinham, Brian, "Getting SCADA by web brownsner? Supervisory Control and Data Acquisition," Control and Instrumentation, No. 12, vol. 28, Dec. 1996, p. 5.

"Wizards wheel over SCADA systems; Supervisory Control and Data Acquisition," Control and Instrumentation, No. 12, vol. 28, Dec. 1996, p. 23.

Fulcher, Jim and Dilger, Karen Abramic, "Soft control, Internet spark ISA/96," Manufacturing Systems, vol. 14, No. 12, Dec. 1996, pp. 40–46.

"Information technology in manufacturing," Manufacturing Systems, vol. 14, No. 12, Dec. 1996, pp. 54–78.

"A sensation in supervisory control," Manufacturing Systems (Windows NT in manufacturing Supplement), Oct. 1996, pp. 12A–24A.

Demetratekes, Pam. "Go with the info flow; state–of–the–art automation in the food industry; includes related article on computer software for food processors," Food Processing, vol. 57, No. 7, Jul. 1996, p. 47.

"New Products Provide Interactive Graphics Over Web Using Netscape Plug–Ins and Java," PR Newswire, May 20, 1996.

"Integrated Systems; Industry's top embedded operating software supports Java," M2 Presswire, Mar. 4, 1996.

"ErgoTech upgrades ErgoCim; First 'plug and play' component software for manufacturing," Business Wire, Feb. 15, 1996.

"Embedded Systems Conference Addresses the Increasing Complexity of Electronic Systems Design; Technical Program and Exhibits Help Embedded Systems Design Professionals Keep Pace with Rapid Change," PR Newswire, Dec. 27, 1995.

"Industry's top embedded operating software supports Java; pSOSystem enables Embedded Internet applications and Low–cost Internet appliances," Business Wire, Feb. 1, 1996.

"Gensym introduces G2 WebMiner for accessing and reasoning about data from the World Wide Web," Business Wire, May 15, 1996.

"Gensym introduces Internet connectivity for its G2 family of intelligent real–time software," Business Wire, Mar. 18, 1996.

"Gensym Announces Its Initiative for Leveraging Intelligent Systems with Internet/Intranet Technology," Business Wire, Oct. 7, 1997.

"At Interop, Will ToasterNet Be on the Hot List?" Data Communications, vol. 19, No. 13, Oct. 1990, p. 214.

Zeff, Joe. "Maui Sunset in Real Time (Modems no Optional)," The New York Times, Nov. 27, 1995, Section D, Column 2, p. 5.

Toner, Mike. "Web's view of world far and wide," The Houston Chronicle, Nov. 5, 1995, p. 6.

"Internet windows to the world," New Media Age, Oct. 26, 1995, p. 4.

Foster, Kirsten. "surf's up; lights, camera, but no action; Steve is a Tech–Nomad. He wanders the streets with a camera on his head. And he wants you to join him," The Independent (London), Aug. 13, 1995, p. 10.

Henry, Jim, PhD., P.E. "Implementation of Practical Control Systems: Problems and Solutions," web page print–out from http://chem.engr.utc edu/Documents/MACSCITECH/MACSCITECHpaper1.html (22 pages), no date.

"Jim Henry's 1996 ASEE Paper," web page print–out from http://chem.engr.utc.edu/Documents/ASEE–96–full.html (5 pages).

Henry, Jim, Ph.D., P.E. "LabVIEW Applications in Engineering Labs: Controls, Chemical, Environmental," ASEE Conference, Anaheim, CA, Jun. 25–28, 1995, web page print–out from http://chem.engr.utc.edu/Documents/ASEE–95–full.html (22 pages).

"Breaking News for Invensys Software Systems Employees; iBaan and FactorySuite 2000 Integration Announced," internal e–mail dated Mar. 23, 2001.

Gertz, Matthew, et al. "A Human–Machine Interface for Distributed Virtual Laboratories," IEEE Robotics & Automation Magazine 1 (1994) Dec., No. 4 (New York) pp. 5–13.

Soreide, N. N., et al., "Mosaic access to real–time data from the TOGA–TAO array of moored buoys," Computer Networks and ISDN Systems 28 (1995), pp. 189–197.

Goldstein, Ira and Hardin, Joseph. "Guest editorial," Computer Networks and ISDN Systems 28 (1995) p. 1.

Slater, A. F. "Controlled by the Web," Computer Networks and ISDN Systems 27 (1994) pp.289–295.

Goldberg, Ken, et al. "Beyond the Web: manipulating the real world," Computer Networks and ISDN Systems 28 (1995) pp. 209–219.

Goldstein, Ira and Hardin, Joseph, "Guest editorial," Computer Networks and ISDN Systems 28 (1995) p. 1.

Goldberg, Ken, et al. "Desktop Teleoperation via the World Wide Web," IEEE International Conference on Robotics and Automation, pp. 654–659, no date.

"Disk Drive with Embedded Hyper–Text Markup Language Server," IBM TDB, Dec. 1995.

"Agenda," ISA/SP50—1988—180, ISA Draft.

Aplication of PRIAM Model to Safety Systems on Offshore Oil/Gas Platforms. Silvertech Ltd., Jan. 9, 1995.

"Automation System Monitors, Controls Fab HVAC, Other Systems," *Microcontamination* (Aug. 1994).

Batch Control. Part I: Models and Terminology. (Approved Feb. 28, 1995) ISA–S88.01 1995.

Benkhallat, Yazid, et al. "Interoperability of sensors and distributed systems," *Sensors and Actuators* A vol. 37–38 (1993), 247–254.

Blevins, Terry. "Characteristics of Function Block Requirements for the Process Industry and Manufacturing Automation," Fisher–Rosemount, Oct. 31, 1995.

Brunn, P. "Collision Avoidance for Two Robots Sharing a Common Workspace," (1995) The Institution of Electrical Engineers.

Burton, P. I. "A personal history of batch control," *Measurement+Control* vol. 27 (Apr. 1994), pp. 69–73.

Burton, P. I., et al. "Field Bus Based on MIL–STD–1553B: Proposal to ISA–SP–50" ERA Technology Ltd. (Apr. 6, 1988) ISA/SP50–1998–148.

Capetta, L., et al. "From Current Actuators and Transmitters Towards Intelligent Actuation and Measurement: PRIAM Approach," BIAS 93.

Caro, Richard H. "Field Bus Applications," ISA (1989) Paper #89–0569, pp. 989–994.

Caro, Richard H. "The Fifth Generation Process Control Architecture," ISA (1988) Paper #88–1487, pp. 659–667.

Caro, Richard H. "The Fifth Generation Process Control Architecture," *ISA Transactions* vol. 28 No. 4 (1989), pp. 23–28.

Chettle, Tim. "Multiplexing techniques optimise data collection," *Electrotechnology* (Oct./Nov. 1995).

Coleman, Vernon. "National Electrical Manufacturers Association Field Bus Report to ISA SP50," (Oct. 1988) ISA/SP50–1988–234.

Conference Record of the 1993 IEEE Industry Applications Conference, Part III (excerpt).

Contents, Proceedings of the Second International Workshop on Configurable Distributed Systems, Mar. 21–23, 1994, Pittsburgh, PA.

Craig, Lynn W. "SP–88 Defines Batch Control,"0 *INTECH* Mar. 1994, pp. 34–37.

Crowder, R. S. "A Communication Architecture for Automation & Control," ISA, pp. 669–673.

Crowder, R. S.. "Generic Data Link Transactions for Simple Devices," Proposal to ISA SP 50 & IEC/SC65C/WG6 (Oct. 15, 1988) ISA Document.

Delahostria. Communication Model Applicatioin Layer. (Oct. 14, 1988) ISA/SP50–1988 247, ISA Draft.

Delfino, B. and Pinceti, P. "Fieldbus Applications for Electrical Industrial systems," *IEEE* (1993), pp. 2084–2090.

Dezso, Danyi. "Halozati szabalyozas," *Meres es Automatika* vol. 37 (1989), pp. 208–213.

Editing Committee Draft Application Layer, Version 6, Dec. 1990.

Editing Committee Draft Application Layer, Version 8, May 1991.

Editing Committee Draft Application Layer, Version 12, Oct. 1991.

Esprit Project 6188, "PRIAM Dictionary: Major Terms and Definitions Used in the PRIAM Project," Prenormative Requirements for Intelligent Acutation and Measurement, May 1995.

Esprit Project 8244, "User Requirements for Intelligent Transmitters and Actuators," European Intelligent Actuation and Measurement User Group, Nov. 24, 1995.

Fieldbus Standard for Use in Industrial Control Systems. Part 2: Physical Layer Specification and Service Definition. (1992) ANSI/ISA–S50.02.

Foxboro Fieldbus Proposal (Presented to ISA SP–50 Committee Feb. 24, 1988) ISA/SP50–1988–123B, ISA Draft.

Furness, Harry. "Fieldbus: The Differences Start From the Bottom Up," *Control Engineering* (Mar. 1994), pp. 75–77.

Holding, David and Wood, Graham. "Communications in microprocessor industrial implementation," *Microprocessors and Microsystems* vol. 3 No. 10 (Dec. 1979), pp. 443–451.

Johnson, Dick. "Pressure Sensing Advances: Are They in Your Process' Future?" *Control Engineering* (Apr. 1995), pp. 67–72.

Kelly, D. Mark. "Digital fieldbus cluster cuts plant's wiring costs up to 20%," *INTECH* (Apr. 1995), pp. 62–64.

Koth, H. and Oeder, K. "The Advantages of Intelligent Field Modules for Nuclear Power Plant Operation and Maintenance," *Kerntechnik* 60 (1996) 5–6, pp. 215–219.

Lenhart, Gerald W. "A Field Bus Approach to Local Control Networks," ISA, Paper #93–281 1993.

Lenhart, Gerald W. "Fieldbus–Based Local Control Networks," *INTECH* (Aug. 1994), p. 31–34.

Loose, Graham. "Fieldbus—the user's perspective," *Measurement+Control* vol. 27 (Mar. 1994), pp. 47–51.

Meeting Minutes, SP50, International Electrotechnical Commission, Technical Committee No. 65: Industrial–Process Measurement and Control, Sub–Committee 65C: Digital Data Communications for Measurement and Control and Working Group 6: Field Bus Standard f.

Meeting Minutes, SP50.4 Application Layer, Oct. 19–21, 1988, Houston, TX.

Meeting Minutes, Windows Working Group of Application Subcommittee, Mar. 1–3, 1989, New Orleans, LA.

Meeting Minutes, Ad Hoc Function Block Meeting, Jun. 14, 1990, Chapel Hill, NC.

Meeting Minutes, SP50, Signal Compatibility of Electrical Instruments, Dec. 5–7, 1990, Orlando, FL.

Meeting Minutes, Process Control Working Group of SP50.4, Jan. 21–23, 1991, Atlanta, GA.

Meeting Notes, International Electrotechnical Commission Sub Committee No. 65C: Digital Communications Working Group 7, Process Control Function Blocks Report to AMT/7. Apr. 4, 1996.

Mirabella, Orazio. "A Short Presentation of IEC Fieldbus Application Layer," Informatics and Communication Institute, Engineering Faculty, University of Catania, Italy.

Morel, G., et al. "Discrete Event Automation Engineering: Outline of the PRIAM Project."

"NCR Fieldbus Slave Controller Advance Information," ISA–SP50–1988–161, ISA Draft.

Noah: Network Oriented Application Harmonisation based on General Purpose Field Communication System. Project description rev. 1.0, Oct. 25, 1995. P–NET, PROFIBUS, WorldFIP.

Nobuhiko, Tsuji, et al. "An Advanced Optical Fieldbus Instrumentation System Using 16x16 Reflection Type Optical Star Coupler and Low Powered Transmiter," pp. 755–764.

Output to Valve, Revision No. 1.4, Jan. 18, 1991, (Draft Document), Instrument Society of America.

Owen, S., et al. "A modular reconfigurable approach to the creation of flexible manufacturing cells for educational purposes," *Fast Reconfiguration of Robotic and Automation Resources* (Colloquium) Oct. 20, 1995, The Institute of Electrical Engineers.

Pace, Hugh W. "Valve Actuators Ready for Fieldbus," *Control Engineer* (Oct. 1995), pp. 65–73.

Petti, Thomas F. and Dhurjati, Prasad S. "A Coupled Knowledge Based System Using Fuzzy Optimization for Advisory Control," *IChE Journal* vol. 38 (Sep. 1992) No. 9, pp. 1369–1378.

Pfeifer T. and Fussel B. "Sensorbetriebssystem fur messtechnische Problemstellungen in der Produktionstechnik," *Technisches Messen* vol. 58 (1991) Nos. 7/8.

Phinney, Thomas L. "An Analysis of Contending Proposals in ISA SP–50 for an ISA/IEC Field Instrument Bus," ISA (1988) Paper #88–1489.

Preface: Field Bus Process Control User Layer Technical Support, Feb. 10, 1993.

Product Specification, I/A Series © RBATCH II.

PROWAY–LAN Industrial Data Highway. (Approved Feb. 3, 1986) ISA–S72.01–1985.

"Radio Field Bus," ISA/SP50—1988–184, ISA Draft.

Report from IEC TC65 Working Group 6 Function Block, May 1, 1995.

Schuur, C. "Comments on 'Analysis and Suggestions for ISA–SP50' as submitted to the SP50 Committee by Honeywell Inc." (Mar. 11, 1988) ISA–SP50–1988–155, ISA Draft.

Schuur, Chris and Warrior, Jay. "Philips Token Passing Field Bus Controller Timed Token Mode," ISA/SP50—1988–186, ISA Draft.

"SDRD Using 1553B Data Link Services," ISA/SP50–1988–243 (1988).

Skabowski, E. L. "Recommendations for Consideration at October, 1988 Application Layer Subcommittee Meeting," (Oct. 3, 1986).

Solvie, Michael J. "Configuration of Distributed Time–Critical Fieldbus Systems," *IEEE* (1994), p. 211.

Strothman, Jim and Ham, John. "Alliances, Fieldbus, Windows Stir ISA/94 Anaheim Pot," *INTECH* (Dec. 1994), pp. 32–35.

Strothman, Jim and Ham, John. "ISA/95 New Orleans: 'Open', NT winds (not Opal) blow Strong," *INTECH* (Nov. 1995), pp. 45–48.

"Suggested Outline for Application Sub–committee Document: Fieldbus Architecture Subcommittee Document," ISA/SP50—1988–175, ISA Draft.

Table of Contents, Automation & Technology Department, 1995.

Table of Contents, Automation & Technology Department, 1993.

Table of Contents, Industrial Computing Society (no date).

Table of Contents, Proceedings of the Industrial Computing Conference, vol. 3, Sep. 19–24, 1993, Chicago, Il. Industrial Computing Society.

[Table of Contents], Proceedings of the 20th International Conference on Industrial Electronics Control and Instrumentation, vols. 1–3, Sep. 5–9, 1994, Bologna, Italy.

[Table of Contents], Proceedings of the 7th Mediterranean Electrotechnical Conference, vol. 1, Apr. 12–14, 1994, Antalya, Turkey.

Table of Contents, ISA/88, Houston, MA, (no date).

Table of Contents, ISA/89, (no date).

Tobin, David. "Southeast Paper Installs Largest Foxboro Distributed Control System,"

"User Layer Structure," SP–50 Technical Report (Jul. 25, 1990).

"User Layer Technical Report," ISA/SP50—1990–389C, ISA Draft.

Weinert, A., et al. "RT/OS—realtime programming and application environment for the COSY control system," *Nuclear Instruments and Methods in Physics Research A* vol. 352 (1994), pp. 277–279.

WG1 List of Criteria (Appendix 1), (Oct. 21, 1988) ISA/SP50–1988–242, ISA Draft.

Wood, G. G. "The Argus CONSUL System for On–Line Computer Control," *Electrical Engineering Transactions* (Mar. 1969), pp. 114–118.

Wood, G. G. "The Challenge of Standards for Plant Communication," IFAC Distributed Computer Control Systems (1982), pp. 191–192.

Wood, G. G. "Current Fieldbus activities," *computer communications* vol. 11 (Jun. 1988) No. 3, pp. 118–123.

Wood, Graeme G. "Data Transmission, Processing and Presentation," pp. 46–54.

Wood, G. G. "Evolution of communication Standards for the process industry," *Measurement + Control* vol. 19 (Jul./Aug. 1986), pp. 183–188.

Wood, Graeme. "Fieldbus Status 1995," *Computing & Control Engineering Journal* (Dec. 1995), pp. 251–253.

Wood, Graeme. "Generic Link Transactions for Simple Devices in Fieldbus." ISA/SP50—1988—240 (Sep. 20, 1988.

Wood, Graeme, G. "Standardisation Work for Communication Among Distributed Industrial Computer Control Systems—A Status Report," INRIA (1984), pp. 67–69.

Wood, G. G. "Survey of LANs and Standards," *Computer Standards & Interfaces* vol. 6 (1987), pp. 27–36.

Wood, G. G. "Towards digital information control," *Measurement + Control* vol. 21 (Jul./Aug. 1988), pp. 179–180.

Stapleton, N. "802.3 Working Group DTE Power via MDI Call for interest," 3COM Jul. 1999.

Berge, Jonas. "Using Ethernet is a no–brainer," *InTech: The International Journal for Measurement and Control* Jul. 2000, pp. 36–39.

Instrument Society of America "Standards and Practices 50 Functional Guidelines" Sep. 9, 1987. (cited in connection with discussion at para. 4.4.)

* cited by examiner

PROCESS CONTROL SYSTEM AND METHOD WITH IMPROVED DISTRIBUTION, INSTALLATION AND VALIDATION OF COMPONENTS

BACKGROUND OF THE INVENTION

The invention pertains to control systems and, more particularly, to methods and apparatus for distributing, installing and/or validating components of such systems.

The terms "control" and "control systems" refer to the control of a device or system by monitoring one or more of its characteristics. This is used to insure that output, processing, quality and/or efficiency remain within desired parameters over the course of time. In many control systems, digital data processing or other automated apparatus monitor the device or system in question and automatically adjust its operational parameters. In other control systems, such apparatus monitor the device or system and display alarms or other indicia of its characteristics, leaving responsibility for adjustment to the operator.

Control is used in a number of fields. Process control, for example, is typically employed in the manufacturing sector for process, repetitive and discrete manufactures, though, it also has wide application in electric and other service industries. Environmental control finds application in residential, commercial, institutional and industrial settings, where temperature and other environmental factors must be properly maintained. Control is also used in articles of manufacture, from toasters to aircraft, to monitor and control device operation.

Digital data processing is firmly entrenched in the control systems. System designers increasingly rely on software to add functionality and flexibility to their systems. The installation and validation of process control system components, for example, has generally been quite simplistic. When a new hardware component is to be installed, an operator or test engineer must take the system offline, install the new component, bring the system back online, and monitor the operation of the component. If satisfied, the engineer makes the installation permanent.

The I/A Series process control systems, manufactured by the assignee hereof, represent a major advance in this technology. They utilize a fault-tolerant architecture in which each control processor (CP), for example, has a redundant, shadow partner. Either of the partners can be replaced or updated while the system is still in operation. To this end, one of the CPs is placed in active mode, while its partner is being upgraded. The upgraded unit is then brought on-line, but only in shadow mode. Its operation is monitored by the engineer or operator, e.g., who compares its output with that of the active CP. If satisfied with the upgraded unit, the engineer can make it active, so that the remaining original CP can be upgraded. Redundant, fault-tolerant operation resumes once both CPs are similarly upgraded.

While the prior art techniques have proven effective to date, the ever increasing complexity of control systems render those techniques problematic. The physical replacement of hardware components, for example, can render maintenance unduly costly. This is exacerbated if the engineer must remain at a remote site until validation of the replacement is complete.

The replacement of software components is only somewhat less demanding. Apart from the aforementioned I/A Series systems, the prior art typically demands that an entire system be upgraded or, at least, taken off-line in order for an upgrade to be performed and tested. Moreover, the replacement of software components in prior art systems requires that the engineer be present at the replacement site, remaining there until the replacement is validated.

An object of this invention is to provide methods and apparatus that overcome these shortcomings. More particularly, an object is to provide improved methods and apparatus that facilitate the distribution, installation and validation of control systems and components.

A further object of the invention is to provide such methods and apparatus as facilitate the installation of components into active or on-line control systems.

A still further object of the invention is to provide such methods and apparatus as facilitate the distribution of control system components, e.g., from a manufacturer's site, and their installation, e.g., at a remote site.

Yet a still further object of the invention is to provide such methods and apparatus as can be readily implemented on existing digital data processing apparatus or special purpose control apparatus.

Still yet further related objects of the invention are to provide such methods and apparatus as can be applied in process control systems, environmental control systems, and the like.

SUMMARY OF THE INVENTION

The foregoing are among the objects attained by the invention, which provides in one aspect a control system with blocks or other components that facilitate validation of their own replacements. Further aspects of the invention provide control systems in which the components to be validated are downloaded and installed from a remote site, e.g., via e-commerce transaction.

Thus, in one aspect, the invention provides a control system that includes first and second control components, e.g., flow control objects for a process control system. The first component is coupled to a third control component, with which it transfers information, e.g., as part of an active or ongoing control process. The third component can be, for example, a temperature control object with which the first component (e.g., a flow control object) is in a cascaded arrangement. The second component can be, for example, an update or other potential replacement for the first component. Thus, for example, if the first component is a flow control object, the second component can be a similar control object with new or improved functionality.

The first and/or second components of a control system according to this aspect of the invention can effect substitution of the second component for the first. More particularly, they can effect coupling of the second component for information transfer with the third component and decoupling of the first component from such transfer with the third component. Preferably, such coupling and decoupling occur while the control system remains active.

According to a related aspect of the invention, prior to its substitution for the first component, the second component is coupled to receive information from the third component and/or any sources from which the first component receives information. The second component, however, is at least temporarily prevented from outputting information to any sinks to which the first component sends information. Instead, the output of the second component can be routed, along with that of the first component, to one or more comparators. These can reside elsewhere in the control system, e.g., in a supervisor object, or within the first and/or second components themselves. Substitution of the second component for the first rests on the success of comparison of their outputs and, in most applications, on confirmation by the operator or test engineer.

By way of example, a comparator can check the output of a newly installed flow control object against the output of an old object it is intended to replace. The comparator can notify the operator of the results of the comparison and, if the operator approves, the new object can be substituted for the old.

Further aspects of the invention provide a control system as described above in which one or more stores, e.g., pointers, symbols, variables, matrices, arrays, tables, records, databases, files, or other information stores, identify relationships between components and, more particularly, their respective sources and sinks. A list maintained in the first component, for example, can identify its various parameters that are sinks for the third component and, likewise, parameters in the third (or other components) for which it (the first component) is the source. Substitution of the second component for the first may be effected, for example, by replacing all connections to/from the first component with connections to/from the second component.

Still further aspects of the invention provide a control system as described above in which the first and second components are resident on a control processor, a "smart" field device, or on another digital data processor-based control device. The configured second component can be downloaded to that device, e.g., from a control system work station, while the control system is active and while the first component is operational, e.g., exchanging information with the third component. By way of further example, downloading from a manufacturer's site to the workstation can be effected as part of a contracted-for maintenance transaction, an upgrade transaction and/or as part of an e-commerce transaction, e.g., between the customer and the manufacturer. Such downloading, moreover, can be instigated by the customer or, automatically, by the first component or a software agent within the control system.

Yet still further aspects of the invention provide methods for control and methods for distributing and/or installing control components paralleling the operations described above.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
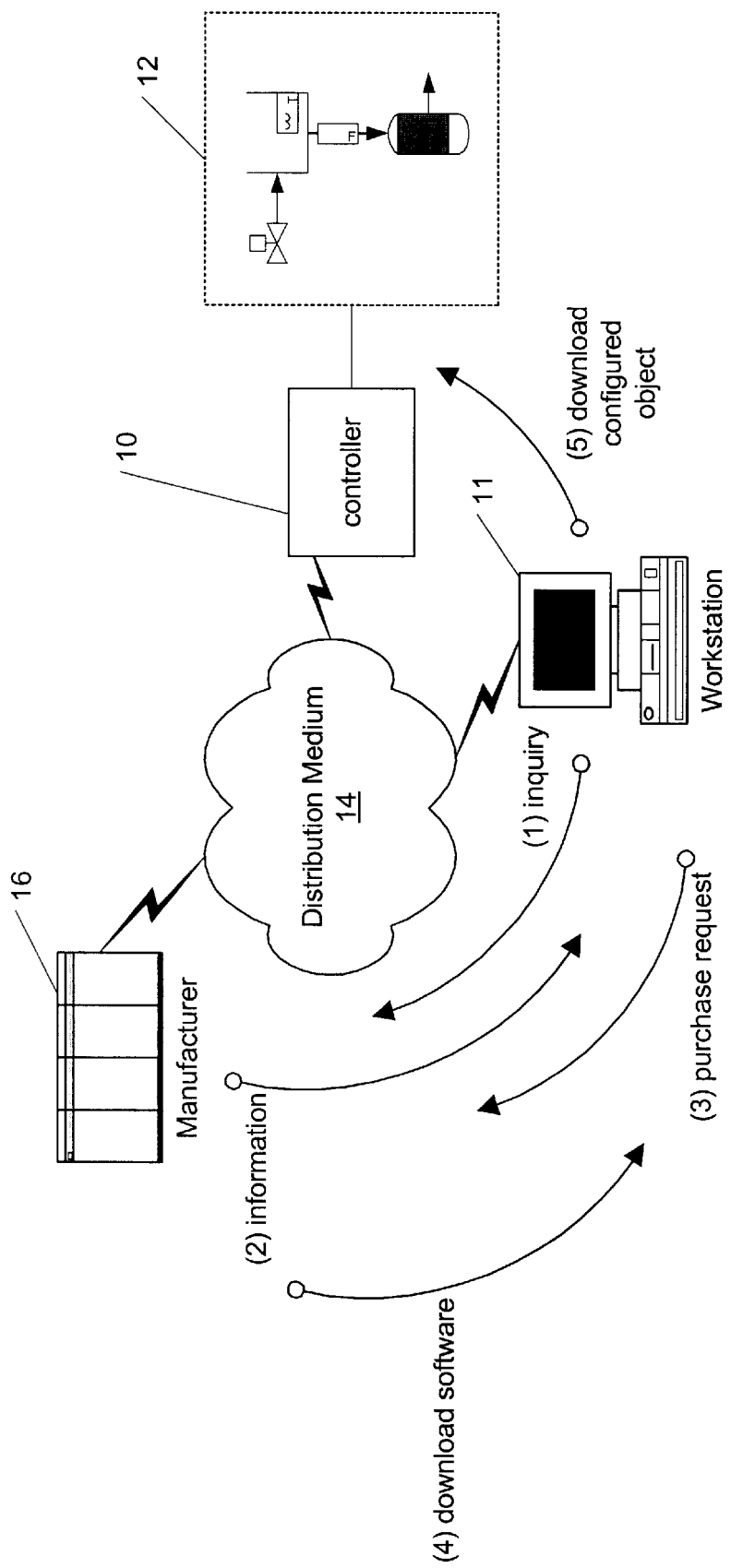
FIG. 1 depicts a plurality of networked digital data processors for use in practicing the invention.

FIG. 1 depicts a digital data processing system of the type with which the invention may be practiced. The system includes a controller or other digital data processor 10 on which resides a process control system for monitoring or controlling a process 12. Though only one element is shown, those skilled in the art will appreciate that digital data processor 10 represents one or more workstations, controllers, microprocessors, embedded processors, "smart" field devices, or other digital data processing apparatus, utilized to control or monitor a process. Such digital data processing apparatus are of the types commercially available in the marketplace, operated in accord with the teachings herein to facilitate process control component installation and/or validation.

Medium 14 provides for transport, from site 16, of process control components —and, more particularly, software aspects thereof—that are to be installed and executed on digital data processor 10. Though illustrated to represent a LAN, WAN, or global network (Internet), those skilled in the art will appreciate that element 14 may represent any medium or mechanism through which software may be transported, electronically, physically or otherwise, from site 16 to digital data processor 10 or workstation 11.

Site 16 represents any source of software-based process control components or definitions thereof. This can include, for example, a retail store, warehouse or other distribution point of CDROMs, diskettes or other magnetic medium on which components or their definitions are stored. In a preferred embodiment, however, it represents a digital data processor that functions as a server, e.g., maintained by a manufacturer or other distributer, from which such components can be electronically transported to the digital data processor 10 or workstation 11. Without detracting from breadth of the teachings herein, site 16 is referred to hereinafter as a "site server."

Process 12 represents any industrial, manufacturing, service, environmental or other process amenable to monitoring or control (hereinafter, collectively, "control"). This is illustrated in greater detail in FIG. 2, wherein a simple such process is shown as including valve 18 that governs the rate of fluid flow to aeration tank 20 which, in turn, transfers the liquid to storage tank 22. Sensors 24 and 26 monitor the state of process 12 and, thereby, facilitate its control by process control system 28 operating on the one or more digital data processors represented by element 10. Thus, sensor 24 is disposed in or adjacent to tank 20 for measuring the temperature of fluid therein, while sensor 26 measures the flow of fluid from aeration tank 20 to storage tank 22.

Figure 2:
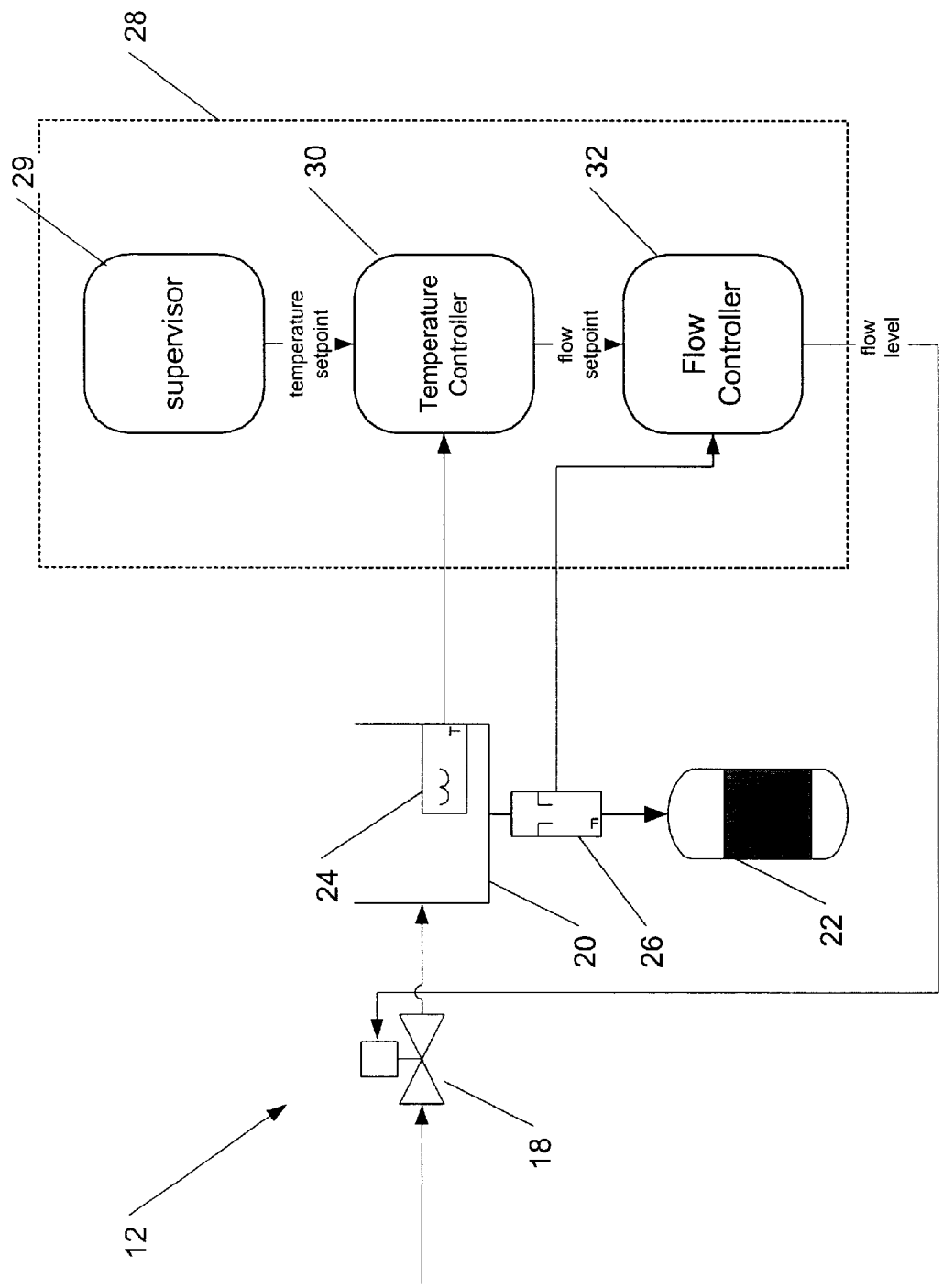
FIG. 2 depicts objects for controlling a process in a system according to the invention.

FIG. 2 illustrates a sample process control system 28 in which the invention is employed. The system 28 includes three process control components 29, 30, 32 which, themselves, may include further components (not shown). Components 29, 30, 32 may comprise any combination of software and hardware features. In the illustrated embodiment only software features are shown—here, as object-oriented programming (OOP) "objects." Other software constructs, by way of non-limiting example, DLL files, may be employed as well.

The workstation 11 or supervisor object 29 may initiate process control functions, including activation and execution of process control objects 30 and 32. The supervisor object 29 generates a temperature supervisory setpoint, e.g., based on operator input or a supervisory program. Object 30 serves as a temperature controller that utilizes a proportional-integral-derivative (PID) or other control algorithm to generate a flow remote setpoint based on the temperature setpoint from the supervisor object 29 and on temperature readings from sensor 24. Object 32 serves as a flow controller that, too, utilizes a PID or other control algorithm to generate a flow level based on the flow setpoint from object 30 and on flow readings from sensor 26. Objects 29, 30, 32 operate in the conventional manner known in the art, as modified in accord with the teachings herein to facilitate installation and/or validation of a further such component, e.g., replacement object 30a (FIG. 3).

In process control terminology, supervisor 29 is referred to as a "source" for PID 30 and, more accurately, for the temperature setpoint parameter used by PID 30. Temperature sensor 24 is also a source for PID 30. PID 32 is, conversely, referred to as a "sink" for PID controller 30 and, more accurately, for the flow setpoint parameter generated by it. Like terminology can be applied to the other elements and parameters that are sources (i.e., suppliers) or sinks (i.e., consumers) of information produced within the system 12.

The identities of the respective sources and sinks are maintained in centralized or distributed stores, e.g., pointers, symbols, variables, matrices, arrays, tables, records, databases, files, in the process control system 28. In one embodiment, for example, a centralized table (not shown), accessible by all of the components, stores those identities.

In a preferred embodiment, each element maintains information about its own sources and/or sinks. Thus, for example, in the illustrated embodiment, component 30 maintains pointers, addresses and/or identifiers of its various parameters that are sinks for information generated by the other components, e.g., elements 29 and 32. It also maintains pointers, addresses and/or identifiers of the components for which it (i.e., component 30) is a source. This facilitates reconnection of any components (e.g., 29, 32) that may be affected by replacement of component 30.

Figure 3C:
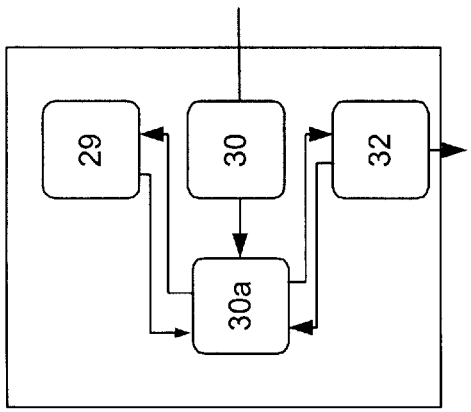
FIGS. 3A–3C depict the insertion and validation of a replacement object in the process control system of FIG. 2.
Figure 3B:
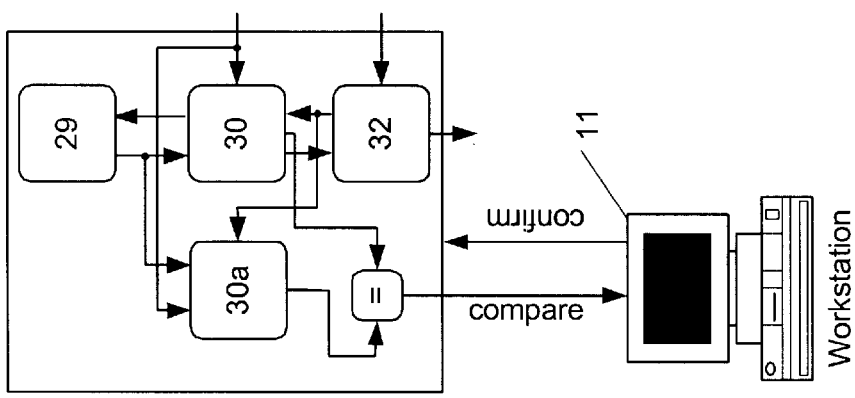
Figure 3A:
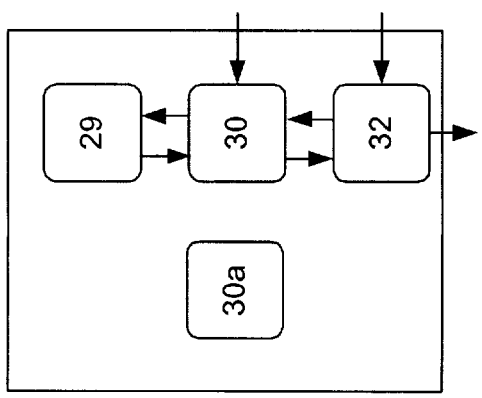

FIGS. 3A–3C depict a methodology for the insertion and validation of a replacement component in the process control system 28. Each drawing shows the system 28 in reduced format, using numeric labels to refer to the same-number blocks of FIG. 2. The components of the system 28 may, as noted above, reside on one or more digital data processing apparatus 10.

In FIG. 3A, a new or replacement component 30*a* is added to system 28, e.g., to the same digital data processor as resides component 30 which it (component 30*a*) will replace. In the illustrated embodiment, in which component 30*a* comprises an OOP object, an OOP class definition comprising an object template and methods is transmitted from the server 16 to a workstation 11, e.g., as part of a contracted-for maintenance transaction, upgrade transaction, or e-commerce transaction. There, an operator or engineer instantiates a replacement object 30*a* from the new class and configures the object for use in controlling process 12 via controller 10. Once configured, the object is downloaded to the controller, where it replaces a prior object 30 as described in further detail below.

Those skilled in the art will appreciate that the replacement object may be downloaded to digital data processor 10 via other mechanisms, as well. Thus, for example, the object definition or preconfigured object may be downloaded directly from server 16 to the digital data processor 10. Moreover, in embodiments that utilize non-OOP constructs, alternate data structures or code constructs (e.g., DDL files) may be downloaded to processor 10 directly or via workstation 11.

Referring back to FIG. 1, depicted there are steps of an e-commerce transaction through which such a download can be effected. In step 1, an operator utilizes workstation 11 to send an inquiry to site server 16. This step, as well as the others required for installation and validation of the component 30*a*, preferably occur while the process control system 28 is online and operational, e.g., controlling process 12, and without substantive disruption or delay of any of the monitor and/or control functions performed by the replaced component, or of any components in communication therewith. As used herein, "substantive disruption or delay" refers to any disruption or delay having more than negligible impact on the aforesaid monitor and/or control functions.

In step 2, the site server 16 responds with information regarding possible upgrades. The server 16 can provide a complete listing of available upgrades or, alternatively, only those applicable to process control system 28.

In step 3, the operator selects a desired upgrade (e.g., the class for component 30*a*) and provides requisite purchase account information, e.g., credit card, PO number, etc. The operator also supplies whatever additional information is required or desirable in order to effect the download from the server 16.

In step 4, the site server 16 downloads the replacement software to workstation 11, e.g., in the form of a java file, a class file, a DLL file (e.g., for non-OOP implementations), or in any other format suitable for adding software aspects of component 30*a* to workstation 11.

In step 5, workstation 11 instantiates and configures component 30*a*, based on the new class, to be similar to component 30 and downloads it for testing in the control processor 10.

Those skilled in the art will, of course, appreciate that numerous other alternatives may be employed to add the class for component 30*a* (or, e.g., in non-object oriented systems, to add the component 30*a*, itself) to digital data processor 10. These include, for example, installing the component from a CDROM, diskette, or other medium. By way of further example, electronic downloading of the component 30*a* can be "requested" by the system 28, itself. For example, the component 30 being replaced can itself query the site server 16 for upgrades, e.g., periodically, upon expiration of an obsolescence timer, in response to messaging from site server 12, or otherwise.

Turning to FIG. 3B, the downloaded component 30*a* is coupled to the sources of the block 30*a* that it is intended to replace, i.e., block 30. In a preferred embodiment, the component is downloaded in the form of a JAVA ".class" file and, hence, it is immediately operational for purposes for such coupling. In other embodiments, additional steps (such as compilation, linking/loading, etc.) required to bring component 30*a* into existence on digital data processor 10 and/or to make it available for coupling into control system 28 can be effected at this time.

The manner in which component 30*a* is coupled to the sources of component 30 varies in accord with the manner in which source information is stored in process control system 28. For example, if pointers to sources for component 30 are maintained in its own stores, component 30*a* can copy that information. Alternatively, if source information is coded into component 30 via a configurator (not shown), such a configurator may be employed to imbue component 30*a* with the same information.

In addition to such "source coupling," the outputs of blocks 30 and 30*a* are routed to a comparator (labeled "=") so that they can be compared. This can reside within supervisor object 29, within components 30, 30*a* themselves, within workstation 11, or elsewhere within the system 28. Routing can be effected by adding additional sinks to blocks 30, 30*a*, i.e., by defining them as sources for the comparator, or otherwise. Apart from routing its outputs to the comparator, replacement object 30*a* is temporarily prevented from applying those outputs to other components, e.g., 29, 32, in the system.

Once coupled as described above, the potential replacement block 30*a* is tested to determine whether its output is comparable with that of the block 30. To this end, block 30*a* processes inputs received identically with block 30 and generates output comparable with that of block 30. Comparison can be performed in any manner known in the art, preferably, using comparison methodologies defined in the newly instantiated object 30a, in the original block 30, or elsewhere in the system. In the illustrated embodiment, graphical or other output indicative of the comparison is generated by the comparator for routing to a log and/or to the operator workstation 11.

If the results of the comparison are acceptable, and if the operator signals his or her confirmation, installation of the replacement module is completed as shown in FIG. 3C. This is effected by further modification of the centralized or distributed source/sink stores so that component 30a is identified as the source or sink of any component 29, 32 for which component 30 was previously so identified. Information regarding component 30 can then be removed from those stores. As with the preceding steps, this too preferably occurs while the process control system 28 is operational so as "not to miss a beat."

In one embodiment, the foregoing operations are effected by executing sequences of the type that follow on the workstation 11 and control processor 10:

Workstation
1. Obtain new composite, block, or part class from server 16.
2. Instantiate new object 30a from class.
3. Instantiate all external bidirectional (cascade) input variables.
4. Configure new object 30a to handle tasks of object it is to replace:
   Connect forward parameter of all cascade inputs and connect variable of all unidirectional inputs to source of inputs of old object.
   Connect back parameter of all cascade outputs to back parameter of existing outputs.
   Create a sinkList object for the list of output sinks of object 30 being replaced.
   Create test runList object.
   Create final runList object.
5. Serialize new object 30a, sinklist object, test runList object, and final runList object to an object file for each.

Control Processor
1. Download new class files.
2. Download new object 30a and new test runList object file.
3. Send message with object names.
4. Set flag in application to instantiate new object 30a from the new class.
5. Read object file to customize object.
6. Replace existing runList with new runList from runlist object file.
7. Continue executing runList.
8. Bring output of old and new objects to display with trends.
9. Let operator experiment by creating transients.
10. If new object performs satisfactorily, the operator pushes the "accept" button.
11. Download sinklist object for the list of output sinks of original object 30 and make new output connections in sink objects.
12. Disconnect (null) inputs in old object 30.
13. Download final runList and continue execution.
14. Change cascade input from forward parameter to variable.
15. Delete (null) old object 30 and object files.

Described above are methods and apparatus achieving the desired objects. Those skilled in the art will appreciate that the embodiments described herein and shown in the drawings are examples of the invention and that other embodiments incorporating one or more of the mechanisms and techniques herein, or equivalents thereof, fall within the scope of the invention.

Thus, for example, further embodiments of the invention provide environmental control systems utilizing apparatus and methods like those herein to monitor and/or control heating, ventilation, cooling, and other environmental factors. Yet still further embodiments of the invention provide industrial control systems, manufacturing control systems, or the like, that also utilize apparatus and methods like those herein to monitor and/or control respective industrial, manufacturing or other processes.

By way of further non-limiting example, it will be appreciated that the comparison phase can involve matching the output of potential replacement object 30a with a standard other than the output of object 30.

By way of still further non-limiting example, it will be appreciated that replacement components can be downloaded directly to a controller or other digital data processing apparatus in which they are to be executed.

In view of the foregoing, what is claimed is:

1. A method of electronic commerce comprising
   transferring, from a first digital data processor to a second digital data processor, as part of an e-commerce transaction any of a first control system component and a definition thereof,
   the first control system component being adapted for use in a control system of the type having a second control system component coupled to and transferring information with a third component,
   any of the first and second control system components being further adapted for decoupling the second and third components from information transfer and coupling the first control component to the third component for transfer of information therewith,
   wherein the transferring step includes transferring any of the first control system component and the definition thereof from the first digital data processor to the second digital data processor in response to a request by the second control component.

2. A method according to claim 1, including the step of keeping the control system operational while the first and third control system components are decoupled from information transfer and wherein the second and third control system components are coupled for information transfer.

3. A method according to claim 1, comprising generating information with the second control system component for possible transfer to the third control system component, which information is comparable with information generated by the first control system component for transfer to such third control system component.

4. A method according to claim 3, comprising comparing information generated by the first control system component for transfer to such third control system component with information generated by the second control system component for possible transfer to the control system third component.

5. A method according to claim 4, comprising applying to an operator console an output indicative of the results of the comparison.

6. A method according to claim 4, comprising responding to any of an operator command and a result of the comparing step by selectively decoupling the first and third control system components from information transfer and, in lieu thereof, coupling the second and third control system components for information transfer.

7. method according to claim 1, comprising providing one or more stores identifying any of sources and sinks of information transferred between the components.

8. A method according to claim 7, comprising updating one or more of the stores in order to decouple the first and third control system components from information transfer and in order to couple the second and third control system components for information transfer.

9. A method according to claim 1, wherein at least the second control component is resident on the second digital data processor.

* * * * *